United States Patent [19]
Bernhardt et al.

[11] Patent Number: 5,166,566
[45] Date of Patent: Nov. 24, 1992

[54] MAGNETIC BEARINGS FOR A HIGH SPEED ROTARY VACUUM PUMP

[75] Inventors: Helmut Bernhardt, Wetzlar; Karl-Heinz Bernhardt, Braunfels, both of Fed. Rep. of Germany

[73] Assignee: Arthur Pfeiffer Vakuumtechnik GmbH, Asslar, Fed. Rep. of Germany

[21] Appl. No.: 360,018

[22] Filed: Jun. 1, 1989

[30] Foreign Application Priority Data

Jun. 1, 1988 [DE] Fed. Rep. of Germany ....... 3818556

[51] Int. Cl.⁵ .............................................. H02K 7/09
[52] U.S. Cl. .................................... 310/90.5; 310/90; 415/90; 417/423.4
[58] Field of Search .................. 310/90.5, 90; 324/207.24; 415/90; 417/423.4

[56] References Cited

U.S. PATENT DOCUMENTS

| | | | |
|---|---|---|---|
| 3,955,858 | 5/1976 | Poubeau | 310/90.5 |
| 4,028,376 | 4/1978 | Wehde | 310/90.5 |
| 4,363,525 | 12/1982 | Poubeau | 310/90.5 |
| 4,444,444 | 4/1984 | Benedetti | 310/90.5 |
| 4,523,896 | 6/1985 | Lhenry | 310/90.5 |
| 4,541,772 | 9/1985 | Becker | 415/90 |
| 4,589,707 | 5/1986 | Caye | 310/90 |
| 4,717,315 | 5/1988 | Miki et al. | 417/365 |
| 4,768,921 | 9/1988 | Shinjiro | 310/90.5 |

FOREIGN PATENT DOCUMENTS

| | | |
|---|---|---|
| 2349033 | 4/1975 | Fed. Rep. of Germany. |
| 2457783 | 6/1976 | Fed. Rep. of Germany. |
| 2644380 | 4/1977 | Fed. Rep. of Germany. |
| 2524061 | 4/1980 | Fed. Rep. of Germany. |
| 3141841 | 5/1983 | Fed. Rep. of Germany. |
| 3239328 | 4/1984 | Fed. Rep. of Germany. |
| 3341716 | 5/1984 | Fed. Rep. of Germany. |
| 3432946 | 3/1986 | Fed. Rep. of Germany. |
| 56-63106(A) | 5/1981 | Japan. |

OTHER PUBLICATIONS

F. Th. Backers, "Ein Magnetisches Lager," Philips' Technische Rundshau, (no month), 1960/61, Nr. 7, pp. 252–259.

Primary Examiner—R. Skudy
Attorney, Agent, or Firm—Anderson Kill Olick & Oshinsky

[57] ABSTRACT

The invention describes a system of magnetic bearings for high speed rotary vacuum pumps, having two radially centering passive magnetic bearings, which originate axially destabilizing forces and thus an unstable point. The axial position is regulated by an electrical solenoid and the operational point of the radial bearing is axially shifted with reference to the unstable point in direction of a high vacuum flange. One of two emergency bearings is located on a high vacuum end and the other is arranged on a fore-vacuum end between the solenoid and the lower passive radial bearing, the rotor, solenoid and position sensor being arranged so as to insure an easy adjustability of the rotor.

5 Claims, 2 Drawing Sheets

MAGNETIC BEARINGS FOR A HIGH SPEED ROTARY VACUUM PUMP

BACKGROUND OF THE INVENTION

The invention is directed to a system of magnetic bearings for a high speed rotary vacuum pump with radially centering passive magnetic bearings, which originate axially destabilizing forces and thus an unstable point, with a dampening arrangement against radial vibrations, with emergency bearings and with electronic active axial position regulation with a position sensor, solenoid and pull-down disk fixed to form one piece with the rotor as a yoke for the solenoid, especially for a turbo-molecular pump.

Currently, most turbo-molecular pumps used are equipped with ball bearings, which are lubricated either with oil or grease. The disadvantage here is that during stoppage of the pump, for instance because of a power outage, lubricant vapors can penetrate to the high vacuum side and can contaminate the receiver or container and the components located therein. Pumps with magnetically supported bearings avoid this disadvantage.

A system of magnetic bearings regulated actively in five axes by solenoids is known, for instance, from DE PS 23 49 033. Also known are magnetic bearings for a turbo-molecular pump with a radially passive magnetic bearing regulated in three axes from DE-OS 33 41 716.

These sets of bearings are expensive because of the required technical resources for each regulating circuit with a sensor, electronics and solenoid per axis. Because of the availability of efficient magnetic compounds based on rare earth materials, there exists today the possibility of building a system of magnetic bearings with a single regulating circuit.

DE-PS 24 57 783 proposes a solution with an upper passive bearing acting axially and radially and an additional axially active bearing which is also effective passively radially. While in case of movements of the rotor in an axial direction, the force of the upper bearing increases according to the square law with increasing air gap widths, and the force of the lower bearing decreases at constant current in the electromagnet in accordance with the square law with decreasing air gap widths.

This poses considerable problems in linearizing the air gap changes measured by the position sensor and the required compensating forces which are a function of the square of the current and air gap. Furthermore, the centering radial force is proportional to the axial force and therefore not constant.

A system of emergency bearings for a set of magnetic bearings is known from DE-PS 25 24 061, which during normal operation, is kept at a distance from the shaft by an axially acting solenoid. In case of emergency bearing operation the lower stator of the emergency bearing is axially displaced by a spring, so that the shaft is centered in the emergency bearings.

SUMMARY OF THE INVENTION

The present invention is based upon the task of presenting a magnetic bearing system having only one axial regulating circuit with a simple linearization mode between current and force, as well as with only slight dependence between the centering radial force and the axial displacement of the rotor. Herein, when the active regulation fails, centering of the shaft in the emergency bearing is to occur without the use of additional auxiliary means.

Pursuant to this task, and others which will become apparent hereafter, one aspect of the present invention resides in the radial centering force of the passive magnetic bearing depending only slightly on the axial rotor displacement. The axial stiffness of the radial bearings being constant in the region between the axial emergency bearing stops. The operational point of the rotor is axially shifted with respect to the unstable point in the direction of the high vacuum flange and the thereby caused axial force acting in the same direction is compensated by pull-down forces of the solenoid. A lower emergency bearing is arranged between the pull-down disk of the solenoid and the lower radially centering magnetic bearing and the rotor movement is axially and radially limited in case of failure of the solenoid.

In a further embodiment, the lower emergency bearing consists of two roller bearings paired so as to be devoid of axial clearance. The axial stiffness of the roller bearings being large compared to the negative stiffness of the passive radial bearing in the axial direction. The lower of the two roller bearings comprises an inner cone which is formed so that the freedom of movement of the shaft is not limited in the operational point of the magnetic bearing, and a hub of the pull-down disk with a cone forms the matching pieces to the inner cone.

In yet another embodiment, the pull-down disk consists of magnetic material and has a hub of non-magnetic material.

In still a further embodiment, the non-magnetic hub of the pull-down disk is fabricated of a wear-resistant material which together with the roller bearing inner ring has good sliding properties.

In another embodiment, the solenoid has parallel faces perpendicular to its symmetrical axis of rotation, and the pull-down disk is provided so as to be rotatable and spaced above the upper surface of the solenoid. The position sensor is arranged on the lower side of the solenoid so as to measure the spacing to a shaft nut, and the sum of the lengths of the shaft nut and the projecting portion of the position sensor is equal to the length of the solenoid.

A rotor which generates an axial pump action in contactless cooperation with the stator elements is supported in two passive radially centered magnetic bearings. One of the bearings is arranged on the high vacuum end of the pump, and the other on the fore-vacuum end. The bearings consist of homopolar rings stacked concentrically upon each other. The inner rings are installed so as to be integral with the housing, and the outer rings are built into the rotor. The operating point of the magnetic bearing is selected so that the rotor portion of the magnetic bearing is shifted towards the high vacuum end of the pump with respect to the stator part by an amount which is small compared to the length of one magnet ring. This results in a force on the rotor towards the high vacuum end which is proportional to the shift between rotor and stator. The radially centering force which is greatest at the unstable point (without axial rotor offset) is only slightly reduced by this shift.

The axial force produced by the passive radial bearing is compensated by an electrical solenoid or lifting magnet, with a disk fastened on the rotor shaft rotating over the pole faces of this solenoid. For this purpose the axial position of the rotor is measured by a position sensor which regulates the current in the solenoid by means of an electronic regulation apparatus so that the rotor is held suspended or in a floating position.

In solenoids with a changeable air gap the force exerted by the solenoid is proportional to the square of the current, and inversely proportional to the square of the air gap widths. A design of the of the radial bearings in accordance with the present invention with constant destabilizing axial stiffness permits a regulation apparatus, where only the non-linearities of the solenoid in the regulators have to be compensated. Linearization of non-linearities of the axial force are not required.

The arrangement of the lower emergency bearing is especially advantageous and consists of two roller bearings paired without clearance between the pull-down disk and the lower magnetic bearing with an axial as well as a radial movement limitation of the shaft. The pull-down disk with the hub consists of a wear-resistant material with good sliding properties, and, together with a cone formed thereon, constitutes a centering unit together with the lower roller bearing with a ground-in cone, which, in case of failure of the electromagnets, centers the rotor automatically in the emergency bearing by the upwards directed force of the magnetic bearings.

The arrangement of the emergency bearing unit, according to a further embodiment of the invention, limits the axial clearance of the rotor to a small range $\Delta Z_1 + \Delta Z_2$, where the regulator is stable in case of external disturbances, meaning it returns the rotor again to the axial operational point without any generation of vibrations. The angle of the centering cone is selected in such a way, that tg $\alpha = \Delta Z_1/\Delta r$. Herein $\Delta Z_1$ is the distance of the cone-shaped emergency bearing stop from the operational point and $\Delta r$ is the radial clearance of the emergency bearing. If tg $\alpha$ increases, then the radial clearance is subjected to more limitation; the centering becomes worse with smaller angle.

An air gap is formed between the pull-down disc and the scanner magnet, whose width can be adjusted in an especially simple manner with an arrangement of the position sensor and the shaft nut, pursuant to another embodiment, wherein the sum of the length of the shaft nut and the position sensor is equal to the length of the electric solenoid. This way the air gaps between the pull-down disk and the solenoid on the one hand and between the shaft nut and the position sensor, on the other hand, are equal. The air gap between the shaft nut and the position sensor can be easily measured by the sensor voltage.

The arrangement of a solenoid acting only on one end is simple, economical and also very reliable because of the small amount of electronics involved. Therefore, a simple emergency current supply with small batteries is also possible.

The arrangement of the lower emergency bearing directly above the pull-down disk or yoke affords other advantages, namely:

1. Because of the short distance between rotor and sensor the heat expansion of the rotor entails only small changes of the emergency bearing axial clearance.

2. The radial forces arising during operation on emergency bearings cause less shaft bending than with an arrangement at the shaft end.

3. In addition, radially destabilizing forces caused by a magnetic shunt, if the bearing is installed in the solenoid, are avoided.

A motor with air coil devoid of radial force such as it is described in DE-OS 34 32 946, is used for driving the pump. This avoids weakening the radial bearings by destabilizing forces.

The apparatus described in DE-PS 32 39 328 is used for dampening radial rotor vibrations.

The invention will be described with particularity below, with the help of FIGS. 1 and 2.

DETAILED DESCRIPTION OF THE PREFERRED EMBODIMENT

Figure 1:
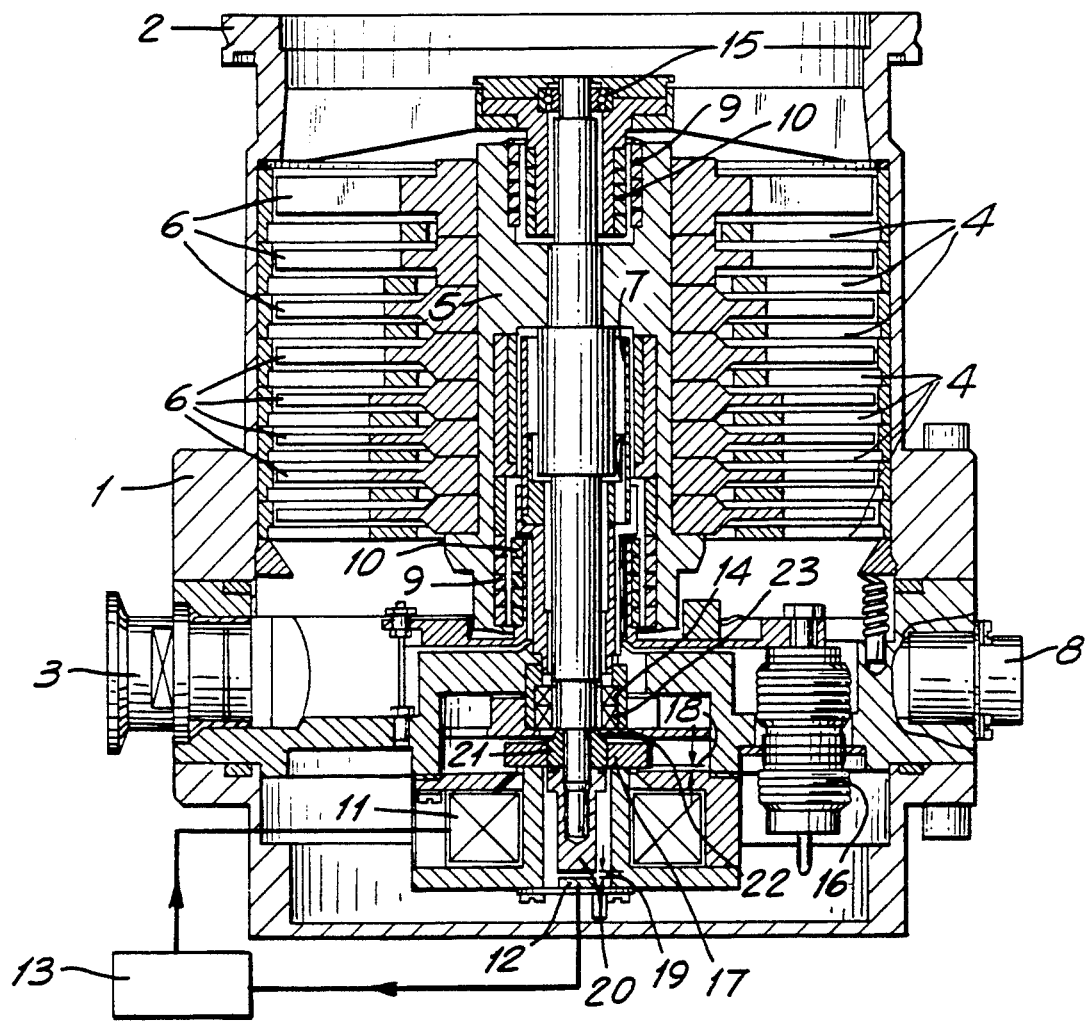
FIG. 1 illustrates a magnetic bearing pursuant to the present invention.

As shown in FIG. 1, stator vanes 4 are installed in a housing 1, which comprises a high vacuum flange 2 and a fore-vacuum flange 3. A magnetically supported rotor 5 carries rotor vanes 6, which revolve between the stator vanes 4 without contacting same and thus produce a pumping effect. The rotor 5 is driven by a motor 7 devoid of radial force. The current supply of the motor and the position regulation of the rotor, as is described in more detail below, occurs through an electrical terminal 8.

The rotor is radially centered by two passive magnetic radial bearings, which each consist of a magnetic bearing rotor rings 9 and a magnetic bearing stator ring 10. One magnetic bearing is located on the high vacuum end and a second one on the fore-vacuum end. The stator and rotor of the magnetic bearings consist of homopolar rings concentrically stacked upon each other. The inner rings, which constitute the magnetic bearing stator ring 10, are installed to be integral with the housing, and the outer rings which constitute the magnetic bearing rotor rings 9 are built into the rotor 5.

The operational point of the magnetic bearing is chosen in such a way, that the rotor rings 9 are shifted or displaced with respect to the stator ring 10 in direction of the high vacuum flange 2. There results thereby a force on the rotor 5 in the direction of the high vacuum flange 2. This axial force is compensated by an electrical solenoid or lifting magnet 11. The current of the solenoid 11 is controlled by a position sensor 12, which registers the axial position of the rotor 5 and by an electronic control device 13. Two emergency bearings 14 and 15, one each on the fore-vacuum side and on the high vacuum side are provided for the case of a malfunction in the magnetic bearing system. An arrangement for dampening of rotor vibrations is designated with 16 and described in more detail in DE-PS 32 39 328.

Figure 2:
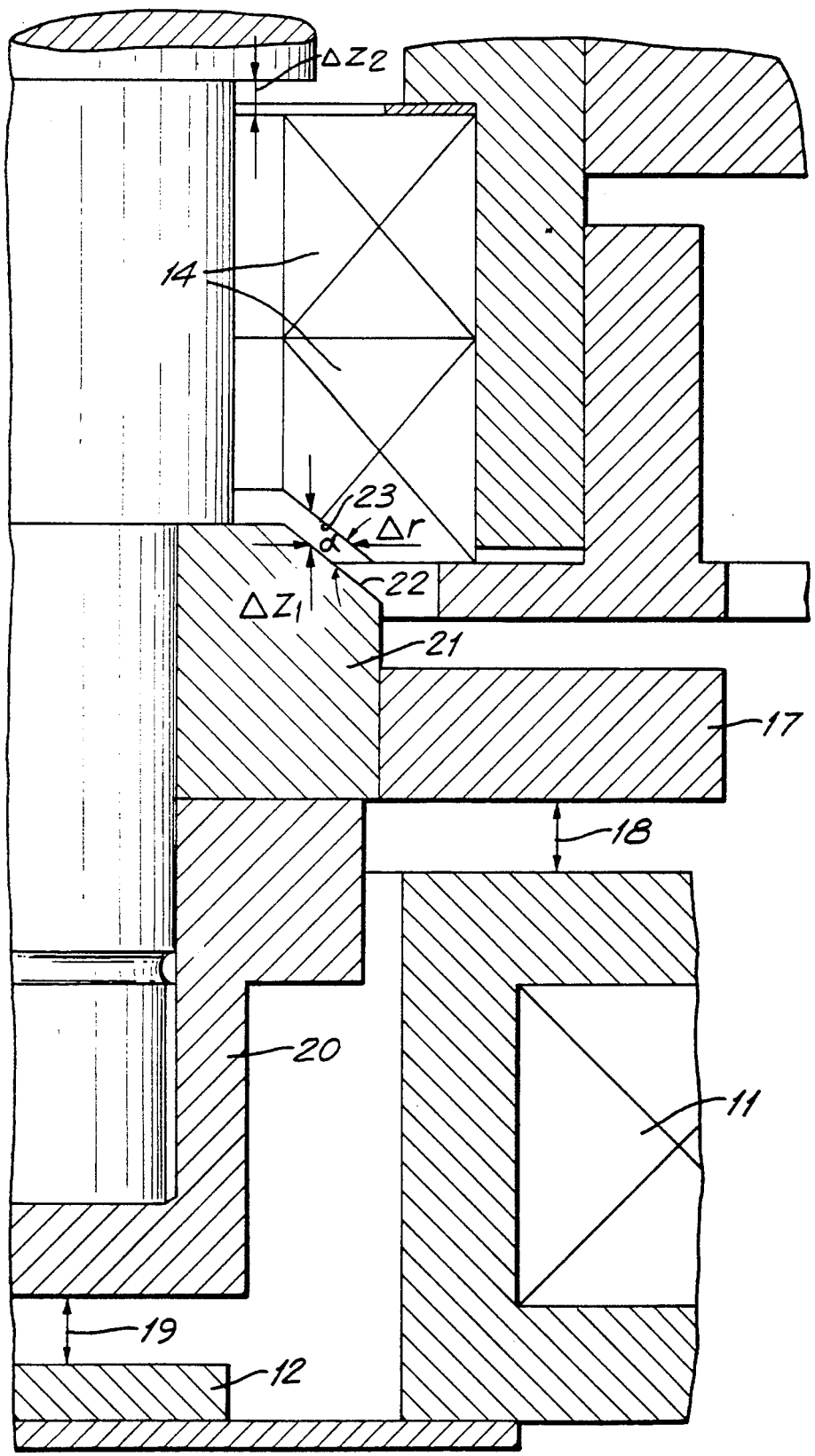
FIG. 2 illustrates an enlarged cutout of the lower bearing region in FIG. 1.

FIG. 2 shows a magnet and a magnified cutout of the lower bearing region. The yoke of the solenoid 11 is formed by a disk mounted on the rotor shaft, which in this case is a pull-down disk 17. The air gap between pull-down disk 17 and the solenoid 11 is designated 18 and the air gap between shaft nut 20 and the sensor 12 is designated 19. The pull-down disk 17 is connected through a hub 21 with the rotor shaft. This hub 21 of the pull-down disk 17 is provided with a cone 22 on the side opposite the lower emergency bearing 14, which cone together with an inner cone 23 of the lower emergency bearing 14, forms the centering unit.

A simple assembly results through the arrangement of a solenoid 11 and position sensor 12 according to a further embodiment of the invention. To begin with, the shaft with an auxiliary device is axially deeper than the intended operational point by the amount of the air gap width and the magnet is centered in this position. Subsequently, the intended air gap 19 is adjusted with the position sensor 12. By the arrangement of solenoid 11 and position sensor 12, in the invention it is assured, that the air gap 18 is equal to the air gap 19 between the position sensor 12 and the shaft nut 20.

While the invention has been illustrated and described as embodied in magnetic bearings for a high speed rotary vacuum pump, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A magnetic bearing system for a high speed rotary vacuum pump, comprising:

radially centering passive magnetic bearings including a lower radially centering magnetic bearing, which bearings originate axially destabilizing forces and thus an unstable point;
   a dampening arrangement against radial vibrations;
   emergency bearings; and
   electronic active axial position regulation means including a position sensor, a rotor, a solenoid and a pull-down disk fixed so as to form one piece with the rotor as a yoke for the solenoid, the passive magnetic bearings having a radial centering force only slightly dependent on axial rotor displacement, the passive magnetic bearings having axial stiffness constant in a region between axial emergency bearing stops, the rotor having an operational point axially shifted with respect to the unstable point in a direction of a high vacuum flange of the pump so as to cause an axial force acting in a same direction, the axial force being compensated by pull-down forces of the solenoid, the emergency bearings, including a lower emergency bearing arranged between the pull-down disk of the solenoid and the lower radially centering magnetic bearing, so that a movement of the rotor is axially and radially limited in case of failure of the solenoid.

2. A magnetic bearing system according to claim 1, and further comprising a shaft nut, the solenoid having parallel faces perpendicular to its symmetrical axis of rotation, the pull-down disk being provided so as to be rotatable and spaced above an upper surface of said solenoid, and a position sensor being arranged on a lower side of the solenoid so as to measure the spacing to shaft nut, the shaft nut and a projecting portion of the position sensor having lengths whose sum is equal to the length of the solenoid.

3. A magnetic bearing system for a high speed rotary vacuum pump, comprising:

radially centering passive magnetic bearings including a lower radially centering magnetic bearing, which bearings originate axially destabilizing forces and thus an unstable point;
   a dampening arrangement against radial vibrations;
   emergency bearings; and
   electronic active axial position regulation means including a position sensor, a rotor, a solenoid and a pull-down disk fixed so as to form one piece with the rotor as a yoke for the solenoid, the passive magnetic bearings having a radial centering force only slightly dependent on axial rotor displacement, the passive magnetic bearings having an axial stiffness constant in a region between axial emergency bearing stops, the rotor having an operational point axially shifted with respect to the unstable point in a direction of a high vacuum flange of the pump so as to cause an axial force acting in a same direction, the axial force being compensated by pull-down forces of the solenoid, the emergency bearings including a lower emergency bearing arranged between the pull-down disk of the solenoid and the lower radially centering magnetic bearing, so that a movement of the rotor is axially and radially limited in case of failure of the solenoid, the lower emergency bearing including two roller bearings paired so as to be devoid of axial clearance, the roller bearings having an axial stiffness which is large compared to a negative stiffness of the radially centered passive magnetic bearings in an axial direction, a lower of the two roller bearings including an inner cone formed so that freedom of movement of a shaft is not limited in an operational point of the magnetic bearing, the pull-down disk having a hub with a cone formed so as to match the inner cone.

4. A magnetic bearing system according to claim 3, wherein the pull-down disk consists of a magnetic material and has a hub of a non-magnetic material.

5. A magnetic bearing system according to claim 4, wherein the non-magnetic hub of the pull-down disk is fabricated of a wear-resistant material, which together with an inner ring of the lower emergency bearing has good sliding properties.

* * * * *